Aug. 25, 1953 K. G. HUNTLEY 2,650,300

PULSE CONVERTING CIRCUITS

Filed Dec. 26, 1950

Inventor
KEITH GORDON HUNTLEY
By Ralph E. Atherton
Attorney

Patented Aug. 25, 1953

2,650,300

UNITED STATES PATENT OFFICE 2,650,300

PULSE CONVERTING CIRCUITS

Keith Gordon Huntley, Harlington, Hayes, England, assignor to Electric & Musical Industries Limited, Hayes, England, a British company Application December 26, 1950, Serial No. 202,706
In Great Britain December 21, 1949

9 Claims. (Cl. 250—27)

Figure 1:
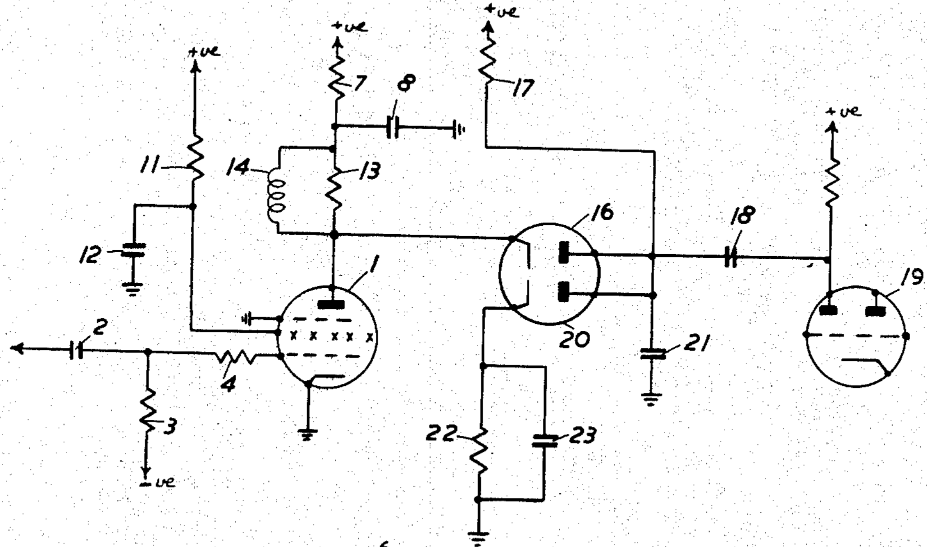

This invention relates to pulse converting circuits such as are employed in television apparatus for the purpose of converting line and frame frequency synchronising pulses into pulses of different amplitudes to facilitate their separation.

In one of the present television transmission systems the line frequency synchronising pulses are of the same amplitude as the frame frequency synchronising pulses, but are of shorter duration. The frame frequency pulses in this system have a duration corresponding to several line periods, and since it is necessary to maintain line frequency synchronism during the occurrence of the frame frequency pulses, the latter in the case of an interlaced system are interrupted at twice line frequency so that in effect each frame frequency pulse is composed of a sequence of pulses, each individual pulse of which has a longer duration than each line frequency synchronising pulse. When receiving such pulses it is necessary to separate the line frequency synchronising pulses from the frame frequency synchronising pulses and for this purpose it is usual to provide a circuit in which the frame frequency synchronising pulses are converted into pulses of a different amplitude from the line frequency synchronising pulses so that only the former pulses can trigger the generator of the frame frequency scanning oscillations. Where an interlaced television system is employed it is important that triggering of the frame frequency scanning generator should occur very accurately otherwise incorrect interlacing will result.

In one known form of converting circuit, the line and frame frequency synchronising pulses are applied to the control electrode of a thermionic valve and the anode circuit of said valve is provided with an integrating circuit which serves to convert the sequence of pulses in each frame frequency synchronising pulse into derived pulses which have a progressively increasing amplitude. The derived pulses in such a circuit can be separated by amplitude selection but since the pulses derived from the frame frequency synchronising pulses have a progressively increasing amplitude, it is found that the generator of the frame frequency scanning oscillations can be triggered indiscriminately, which gives rise in television receivers to what is colloquially called "jittering." This is particularly noticeable in receivers operating with interlaced scanning.

The object of the present invention is to provide an improved converting circuit adapted to convert broad pulses into pulses of larger amplitude than pulses derived from said narrow pulses but in which the above mentioned disadvantage is substantially overcome.

According to the present invention, a pulse converting circuit is provided for converting a series of narrow pulses and a sequence of broad pulses into derived pulses in which the pulses derived from said broad pulses are of greater amplitude than the pulses derived from said narrow pulses, said circuit comprising a thermionic valve having an input circuit connected to an input electrode of said valve and to which said narrow and broad pulses are applied, an output circuit connected to an output electrode of said valve and having in said output circuit a converter to convert said narrow and broad pulses into pulses of different amplitudes and a time constant circuit connected to another electrode of said valve to cause said valve to become progressively less conducting during the conversion of said broad pulses. Said valve may constitute the separator valve of a television receiver which serves to separate the synchronising pulses from the picture signals. Preferably said valve is of the screen grid type and said time constant circuit is constituted by the decoupling circuit of the screening grid of said valve.

Preferably, the anode circuit of said valve includes a ringing circuit which serves to ring each time a transient passes through the circuit so that the amplitude of the derived pulses is effectively increased by the ringing derived from said circuit so that the derived pulses are of very pointed form. By employing a circuit in accordance with the invention the frame frequency generator may be arranged to be triggered on the first of the pulses derived from the broad frame frequency synchronising pulses which is of the largest amplitude, thus ensuring correct operation of the scanning generator. If, however, the first of the derived pulses should be obscured by interference then it may be arranged that the frame frequency generator is triggered by the second of the derived pulses.

Figure 2:
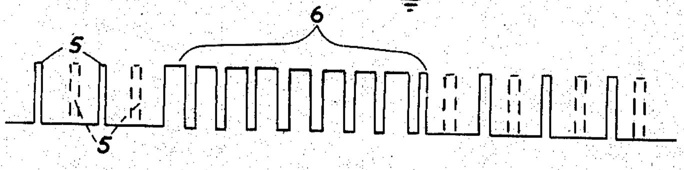
Figure 3:
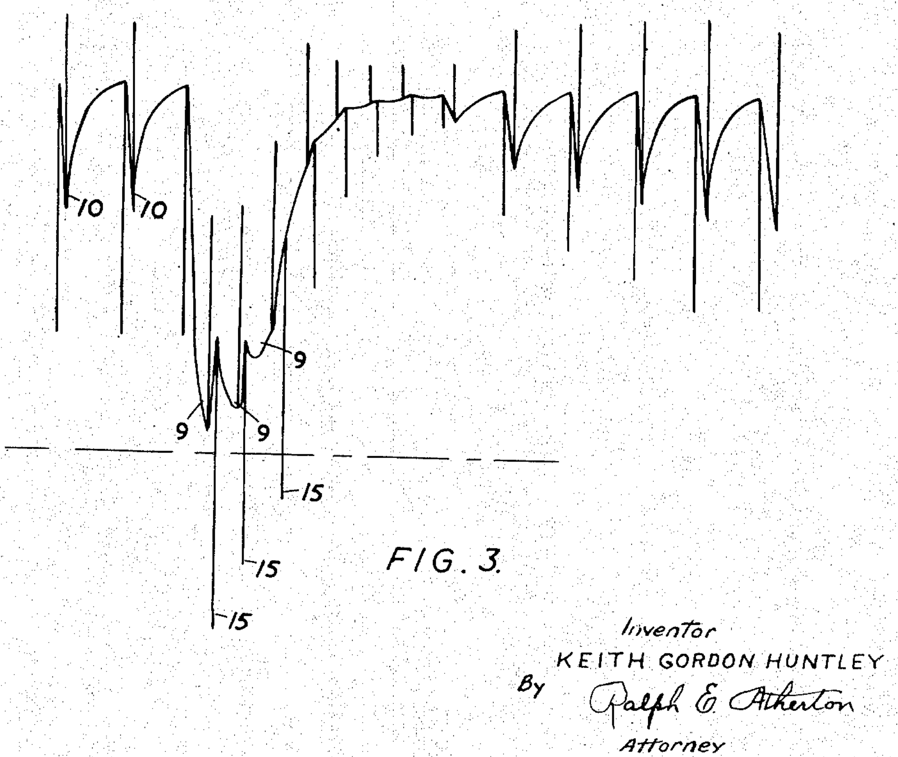

In order that the said invention may be clearly understood and readily carried into effect, the same will now be more fully described with reference to the accompanying drawings in which:

Figure 1 illustrates a converting circuit in accordance with the invention for use in a television receiver, Figure 2 illustrates the waveform of line and frame frequency synchronising pulses, and Figure 3 the waveform of derived pulses.

As shown in Figure 1, the circuit comprises a thermionic valve 1 shown in the form of a pentode valve to the control electrode of which picture signals and line and frame frequency synchronising pulses are applied through a coupling condenser 2, leak resistance 3 and coupling resistance 4, the valve 1 being so arranged that the picture signals are separated from the line and frame frequency synchronising pulses so that the valve 1 is effectively controlled only by the separated line and frame frequency synchronising pulses which are of the form shown in Figure 2. In this figure, the reference numeral 5 indicates the line frequency synchronising pulses and the reference numeral 6 the frame frequency synchronising pulse which is interrupted at double line frequency in known manner so that the frame frequency synchronising pulse 6 effectively comprises a sequence of pulses each of which is of longer duration than each line frequency synchronising pulse 5. The dotted line pulses 5 indicate the position of the line frequency synchronising signals in alternate frames since it is assumed that the receiver is operating with interlaced scanning. The synchronising pulses 5 and 6 are applied at the control electrode of valve 1 in the positive sense and the resultant anode current of valve 1 is integrated by a resistance 7 which is connected between the anode of the valve 1 and a source of positive potential and a condenser 8 the time constant of the resistance 7 and condenser 8 being 20 micro-seconds for a television system with line scanning frequency of 405 lines and 25 complete pictures per second. With such a system, the sequence of broad pulses 6 has a duration of 450 microseconds. The integrating circuit 7 and 8 serves to produce from the broader frame frequency synchronising pulses 6 derived pulses 9, as shown in Figure 3 which represents the voltage waveform derived from the anode current of valve 1, which are of larger amplitude than the derived pulses 10 which are obtained from the line synchronising pulses 5. The screening grid of the valve 1 is connected to a source of potential through a resistance 11 which is decoupled to earth by a condenser 12. The effective time constant of the decoupling circuit 11 and 12 taking into account the screen grid to cathode impedance of the valve 1 may be 160-micro-seconds for a system operating as above described that is, shorter than the duration of the sequence of broad pulses 6. During the occurrence of the broad pulses in the valve 1 the mean anode current of the valve increases and the potential across the condenser 8 starts to decrease. This decrease in potential, however, continues only for the duration of the first of the broad pulses 6. The condenser 12 is chosen so that the peak cathode current of the valve 1 commences to fall during the first broad pulse so that, as will be observed from Figure 3, the amplitude of the derived pulses 9 progressively decreases. Preferably, the anode circuit of valve 1 includes a further resistance 13 shunted by an inductance 14, the resistance 13 and inductance 14 constituting a ringing circuit which rings each time a transient occurs with the result that the current waveform has added thereto very pointed portions indicated at 15 and preferably these pointed portions of the waveform are employed for triggering a multivibrator employed in the frame frequency scanning generator. As shown, the anode of the valve 1 is connected to the cathode of a diode valve 16, the anode of which is connected to a source of potential through a resistance 17 and is also connected through a coupling condenser 18 to the anode of a valve 19 which forms part of a multivibrator which is employed in the frame frequency scanning generator, in known manner. The diode 16 is arranged by a suitable choice of its anode potential to separate, at the level indicated by the chain dotted line in Figure 3, two or three of the pointed portions 15 from the rest of the waveform, these separated portions being then utilised to control the valve 19, the valve 19 being preferably employed to generate a frame frequency timing pulse of rectangular form for application to the scanning generator. In order to overcome any tendency for line frequency transients to pass through the condenser 18 to the valve 19 due to the inter-electrode capacity of the diode 16, it is preferred to employ a further diode 20 which, together with the diode 16, may constitute a double-diode or, alternatively, a germanium or metal rectifier may be employed for the diode 20. The anode of the diode 20 is connected to the anode of the diode 16 and to earth through a condenser 21 of about 30 micro-microfarads, whilst the cathode of the diode 20 is provided with a load comprising a resistance 22 bypassed by a condenser 23.

The present invention thus provides a converting circuit in which the pulses derived from each frame frequency synchronising pulse are of progressively decreasing amplitude so that it is possible to ensure in normal circumstances that the multivibrator associated with the frame scanning generator is always triggered on the first of the derived pulses. Should, however, the first of such pulses be obscured by interference then the multivibrator can be triggered by the second or third of the derived pulses.

What I claim is:

1. A pulse converting circuit for converting a series of narrow pulses and a sequence of broad pulses into derived pulses in which the pulses derived from said broad pulses are of greater amplitude than that of the pulses derived from said narrow pulses, said circuit comprising a thermionic valve having an input circuit connected to an input electrode of said valve and to which said narrow and broad pulses are applied, an output circuit connected to an output electrode of said valve and having in said output circuit a converter to convert said narrow and broad pulses into pulses of different amplitudes, and a time constant circuit connected to another electrode of said valve and having a time constant shorter than the duration of said sequence of broad pulses to cause said valve to become progressively less conducting during the conversion of said broad pulses.

2. A pulse converting circuit for converting a series of narrow pulses and a sequence of broad pulses into derived pulses in which the pulses derived from said broad pulses are of greater amplitude than that of the pulses derived from said narrow pulses, said circuit comprising a thermionic valve having an input circuit connected to an input electrode of said valve and to which said narrow and broad pulses are applied, an output circuit connected to an output electrode of said valve and having in said output circuit a converter to convert said narrow and broad pulses into pulses of different amplitudes, and a time constant circuit connected to a screening grid of said valve and having a time constant shorter than the duration of said sequence of broad pulses to cause said valve to become progressively less conducting during the conversion of said broad pulses.

3. A pulse converting circuit for converting a series of narrow pulses and a sequence of broad pulses into derived pulses in which the pulses derived from said broad pulses are of greater amplitude than that of the pulses derived from said narrow pulses, said circuit comprising a thermionic valve having an input circuit connected to an input electrode of said valve and to which said narrow and broad pulses are applied, an output circuit connected to an output electrode of said valve and having in said output circuit an integrating circuit to convert said narrow and broad pulses into pulses of different amplitudes, and a time constant circuit connected to another electrode of said valve and having a time constant shorter than the duration of said sequence of broad pulses to cause said valve to become progressively less conducting during the conversion of said broad pulses.

4. A pulse converting circuit for converting a series of narrow pulses and a sequence of broad pulses into derived pulses in which the pulses derived from said broad pulses are of greater amplitude than that of the pulses derived from said narrow pulses, said circuit comprising a thermionic valve having an input circuit connected to an input electrode of said valve and to which said narrow and broad pulses are applied, an output circuit connected to an output electrode of said valve and having in said output circuit an integrating circuit to convert said narrow and broad pulses into pulses of different amplitudes, and a time constant circuit connected to a screening grid of said valve and having a time constant shorter than the duration of said sequence of broad pulses to cause said valve to become progressively less conducting during the conversion of said broad pulses.

5. A pulse converting circuit for converting a series of narrow pulses and a sequence of broad pulses into derived pulses in which the pulses derived from said broad pulses are of greater amplitude than that of the pulses derived from said narrow pulses, said circuit comprising a thermionic valve having an input circuit connected to an input electrode of said valve and to which said narrow and broad pulses are applied, an output circuit connected to an output electrode of said valve and having in said output circuit a converter to convert said narrow and broad pulses into pulses of different amplitudes together with an inductive element to provide a ringing circuit, and a time constant circuit connected to another electrode of said valve and having a time constant shorter than the duration of said sequence of broad pulses to cause said valve to become progressively less conducting during the conversion of said broad pulses.

6. A pulse converting circuit for converting a series of narrow pulses and a sequence of broad pulses into derived pulses in which the pulses derived from said broad pulses are of greater amplitude than that of the pulses derived from said narrow pulses, said circuit comprising a thermionic valve having an input circuit connected to an input electrode of said valve and to which said narrow and broad pulses are applied, an output circuit connected to an output electrode of said valve and having in said output circuit a converter to convert said narrow and broad pulses into pulses of different amplitudes together with an inductive element to provide a ringing circuit, and a time constant circuit connected to a screening grid of said valve and having a time constant shorter than the duration of said sequence of broad pulses to cause said valve to become progressively less conducting during the conversion of said broad pulses.

7. A pulse converting circuit for converting a series of narrow pulses and a sequence of broad pulses into derived pulses in which the pulses derived from said broad pulses are of greater amplitude than that of the pulses derived from said narrow pulses, said circuit comprising a thermionic valve having an input circuit connected to an input electrode of said valve and to which said narrow and broad pulses are applied, an output circuit connected to an output electrode of said valve and having in said output circuit an integrating circuit to convert said narrow and broad pulses into pulses of different amplitudes together with an inductive element to provide a ringing circuit, and a time constant circuit connected to another electrode of said valve and having a time constant shorter than the duration of said sequence of broad pulses to cause said valve to become progressively less conducting during the conversion of said broad pulses.

8. A pulse converting circuit for converting a series of narrow pulses and a sequence of broad pulses into derived pulses in which the pulses derived from said broad pulses are of greater amplitude than that of the pulses derived from said narrow pulses, said circuit comprising a thermionic valve having an input circuit connected to an input electrode of said valve and to which said narrow and broad pulses are applied, an output circuit connected to an output electrode of said valve and having in said output circuit an integrating circuit to convert said narrow and broad pulses into pulses of different amplitudes together with an inductive element to provide a ringing circuit, and a time constant circuit connected to a screening grid of said valve and having a time constant shorter than the duration of said sequence of broad pulses to cause said valve to become progressively less conducting during the conversion of said broad pulses.

9. A pulse converting circuit for converting a series of narrow pulses and a sequence of broad pulses into derived pulses in which the pulses derived from said broad pulses are of greater amplitude than that of the pulses derived from said narrow pulses, said circuit comprising a thermionic valve having an input circuit connected to an input electrode of said valve and to which said narrow and broad pulses are applied, an output circuit connected to an output electrode of said valve and having in said output circuit an integrating circuit consisting of a resistance in series with said valve and a condenser effectively in shunt with said resistance to convert said narrow and broad pulses into pulses of different amplitudes, and an inductive element in series with said integrating circuit between said integrating circuit and the anode of said valve to provide a ringing circuit, said valve having a screening grid connected through a resistance to a source of potential and to a point of lower potential through a condenser, the time constant of the resistance and condenser connected to said screening electrode being shorter than the duration of the sequence of broad pulses to cause said valve to become progressively less conducting during the conversion of said broad pulses.

KEITH GORDON HUNTLEY.

References Cited in the file of this patent

UNITED STATES PATENTS

| Number | Name | Date |
|---|---|---|
| 2,181,309 | Andrien | Nov. 28, 1939 |
| 2,210,523 | Blumlein | Aug. 6, 1940 |
| 2,359,447 | Seeley | Oct. 3, 1944 |
| 2,423,304 | Fitch | July 1, 1947 |
| 2,508,923 | Mautner | May 23, 1950 |
| 2,539,374 | Pourciau et al. | Jan. 23, 1951 |
| 2,583,021 | Smyth | Jan. 22, 1952 |